United States Patent
Bertosa et al.

(10) Patent No.: US 7,577,503 B2
(45) Date of Patent: Aug. 18, 2009

(54) VEHICLE DIAGNOSTIC DEVICE WITH ADAPTIVE DATA RETRIEVAL AND METHOD

(75) Inventors: Thomas Bertosa, Chardon, OH (US); Michael Gessner, Akron, OH (US); Neil Somos, Brecksville, OH (US)

(73) Assignee: SPX Corporation, Charlotte, NC (US)

( * ) Notice: Subject to any disclaimer, the term of this patent is extended or adjusted under 35 U.S.C. 154(b) by 343 days.

(21) Appl. No.: 11/524,944

(22) Filed: Sep. 22, 2006

(65) Prior Publication Data
US 2007/0073460 A1    Mar. 29, 2007

Related U.S. Application Data

(60) Provisional application No. 60/719,598, filed on Sep. 23, 2005.

(51) Int. Cl.
*G01M 17/00* (2006.01)

(52) U.S. Cl. .......................................... 701/33; 701/29

(58) Field of Classification Search .............. 701/29–35
See application file for complete search history.

(56) References Cited

U.S. PATENT DOCUMENTS

| | | | | |
|---|---|---|---|---|
| 4,638,428 A * | 1/1987 | Gemma et al. | ............... | 710/241 |
| 5,319,785 A * | 6/1994 | Thaller | ........................ | 710/15 |
| 5,916,286 A * | 6/1999 | Seashore et al. | ............... | 701/29 |
| 6,640,268 B1 * | 10/2003 | Kumar | ........................ | 710/46 |
| 7,012,512 B2 * | 3/2006 | St. Denis | .................... | 340/438 |
| 2002/0007237 A1 * | 1/2002 | Phung et al. | .................. | 701/33 |

* cited by examiner

*Primary Examiner*—Peter D Nolan
(74) *Attorney, Agent, or Firm*—Baker & Hostetler LLP

(57) ABSTRACT

A diagnostic tool with an adaptive method is provided that will adaptively change the time interval at which the tool interrogates the vehicle if the tool determines if a diagnostic test is not progressing. The tool can interrogate at that interval until it reaches the iteration limit. The tool can also restart at the previous time interval and iteration limit if the tool recognizes that it was previously communicated with the vehicle.

18 Claims, 6 Drawing Sheets

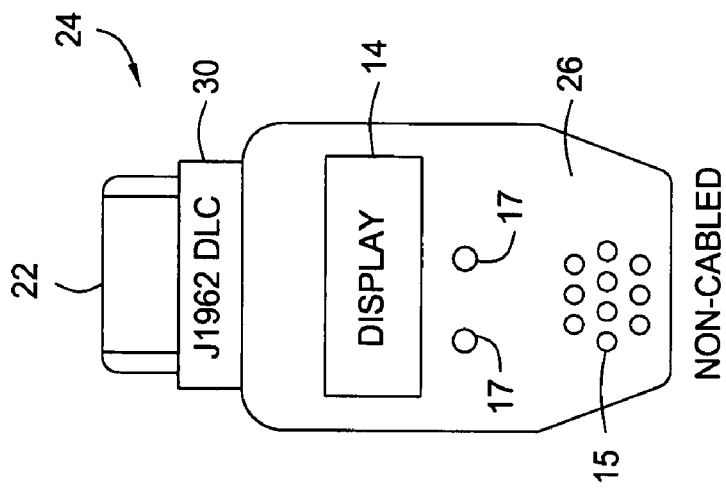
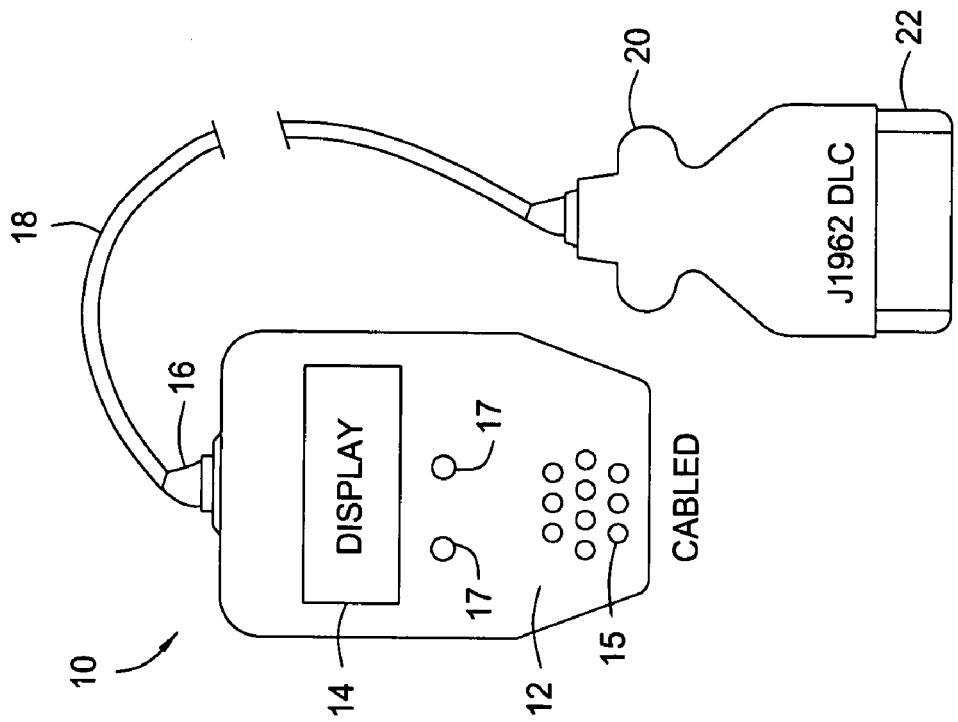

VEHICLE DIAGNOSTIC DEVICE WITH ADAPTIVE DATA RETRIEVAL AND METHOD

CROSS-REFERENCE TO RELATED APPLICATIONS

This application claims priority to U.S. Provisional Patent Application No. 60/719,598 entitled, "OBD II READINESS MONITOR TOOL APPARATUS AND METHOD," filed Sep. 23, 2005, which is hereby incorporated by reference in its entirety.

FIELD OF THE INVENTION

The present invention relates generally to vehicle diagnostic tools. In particular, it relates to a vehicle diagnostic tool that includes an adaptive data retrieval software.

BACKGROUND OF THE INVENTION

Recently manufactured vehicles are equipped with a special system called On-Board Diagnostic II (OBD II). OBD II monitors all engine and drive train sensors and actuators for shorts, open circuits, lazy sensors and out-of-range values as well as values that do not logically fit with other power train data. Thus, OBD II keeps track of all of the components responsible for emissions and when one of them malfunctions, it signals the vehicle owner by illuminating a Malfunction Indicator Lamp (MIL), such as a check engine indicator. It also stores Diagnostic Trouble Codes (DTCs) designed to help a technician find and repair the emission related problem. OBD II also specifies the means for communicating diagnostic information to equipment used in diagnosing, repairing and testing the vehicle.

An illuminated MIL means that the OBD II system has detected a problem that may cause increased emissions. A blinking MIL indicates a severe engine misfire that can damage the catalytic converter. The MIL is reserved for emission control and monitored systems and may not be used for any other purpose. The "Check Engine," "Service Engine Soon" or other "engine symbol" message is typically used as a MIL indicator.

The Clean Air Act of 1990 requires inspection and maintenance (I/M) programs to incorporate OBD II testing as part of a vehicle's emissions inspection program. When fully implemented, 1996 and newer model year vehicles registered in a required emission test area must be tested annually. If DTCs are present, or the diagnostic monitor software has not adequately tested the vehicle's emission control systems, the vehicle fails the emissions test. Otherwise, the vehicle passes the emissions test.

In order for a vehicle to pass the OBD II emissions tests, the vehicle under test (VUT) must report that all pertinent (as defined by each state) diagnostic monitors have completed their tests of the vehicle system. Diagnostic monitors that have completed their tests are said to be in a "Ready" state. Diagnostic monitors that have not completed their tests are said to be in a "Not Ready" state. Checking the readiness state of the diagnostic monitors via OBD II was incorporated into emissions testing to prevent owners from attempting to pass vehicles not in compliance by simply clearing the vehicle's Diagnostic Trouble Codes and then quickly retesting the vehicle before the root problem was again detected by the vehicle's on board computer. Clearing the DTCs on a vehicle also sets all of the monitors to the "Not Ready" state. Until the vehicle has been driven under the proper conditions for all of the monitors to execute their tests, the vehicle will not be ready for an emissions test.

The readiness state of the diagnostic monitors of the OBD II system indicates that emission system components have been checked. If a particular monitor is set to "Ready," the monitor has checked its assigned components and systems. If a problem is found, a DTC is set, and a technician can retrieve the code. When all of the monitors supported on a vehicle are "Ready," the vehicle is ready for an emissions test.

Unlike DTCs, the readiness state of the diagnostic monitors cannot be manipulated via a scan tool, rather their status is altered by a Drive Cycle, which is a series of specific vehicle operating conditions that enable the diagnostic monitors to test the vehicle's emissions control hardware. As each monitor completes its testing, its readiness state will be set to "Ready." An example of a simple Drive Cycle is where the vehicle's engine is started, and the vehicle is driven for seven minutes. Then the vehicle is driven in stop-and-go traffic for six minutes including one minute of idling. After which, the vehicle is accelerated to forty-five miles per hour and maintained at that speed for one minute.

Repair shops and drivers may not be aware of when the vehicle is "Ready" to be tested for emissions, or when the required Drive Cycle has been completed in order to properly test the vehicle's emissions. Therefore, repair facilities need an inexpensive tool that enables either an untrained personnel (such as a driver) or a trained repair facility personnel, to determine the status of the OBD II readiness state of the diagnostic monitors while operating the vehicle through normal driving conditions. In addition, repair facilities need to encourage their client to return to their shop after the readiness monitors have been reset to the "Ready" position in order to verify the repair and/or complete the emissions testing.

When the tool is plugged into the vehicle, it will start to interrogate the vehicle's diagnostic systems at a set interval. This set interval, however, may interfere with the vehicle's diagnostic system tests and not allow the tests to proceed. Thus, the tool may not be able to retrieve the data that it needs to complete its own test as the vehicle can not complete its own tests.

Accordingly, a tool is desired that can interrogate a vehicle without interfering with the vehicle's own diagnostic system tests. The tool should be able to adapt and change the interval time in which it interrogates or communicates with the vehicle.

SUMMARY OF THE INVENTION

The foregoing needs are met, to a great extent, by the present invention, wherein in one aspect a device and method are provided that in some embodiments can adaptively communicate with the vehicle's diagnostic systems by modifying when the device communicates and requests test data from the vehicle diagnostic system so that it does not interfere with the vehicle's own diagnostic systems tests.

In accordance with one embodiment of the present invention, a vehicle diagnostic tool is provided and includes a processor that can be operably coupled to a vehicle diagnostic connector to diagnose a vehicle, at least one vehicle communication protocol interface operatively coupled to the processor and can allow the processor to communicate with the vehicle, a memory operably coupled to the processor, a software stored in the memory, wherein the software adaptively changes the interval at which the processor communicates with the vehicle when the software detects that the data being received from the vehicle is not progressing for a particular diagnostic test, and a housing surrounding the processor, the at least one vehicle communication protocol interface, the memory, wherein the housing has a port configured to couple to a computing device.

In accordance with another embodiment of the present invention is a method of adaptively communicating with a vehicle using a diagnostic tool is provided and includes connecting the diagnostic tool to a data link connector of a vehicle, reading characterizing information of the vehicle, communicating with the vehicle to perform a diagnostic test on the vehicle with the diagnostic tool at a first time interval, determining whether the diagnostic test with the vehicle is progressing based on the sequence of the diagnostic test, and changing to a second time interval and communicating at the second interval for an iteration limit when the diagnostic test is not progressing.

In accordance with yet another embodiment of the present invention, an article that includes a machine-accessible medium having associated data, wherein the data, when accessed, can result in a vehicle diagnostic tool performing reading characterizing information of a vehicle, communicating with the vehicle to perform a diagnostic test on the vehicle with the diagnostic tool at a first time interval, determining whether the diagnostic test with the vehicle is progressing based on the sequence of the diagnostic test, and changing to a second time interval and communicating at the second interval for an iteration limit when the diagnostic test is not progressing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a plan view illustrating a cabled apparatus according to an embodiment of the invention.

FIG. 2 is a plan view of a non-cabled apparatus according to another embodiment of the invention.

DETAILED DESCRIPTION

Figure 3:
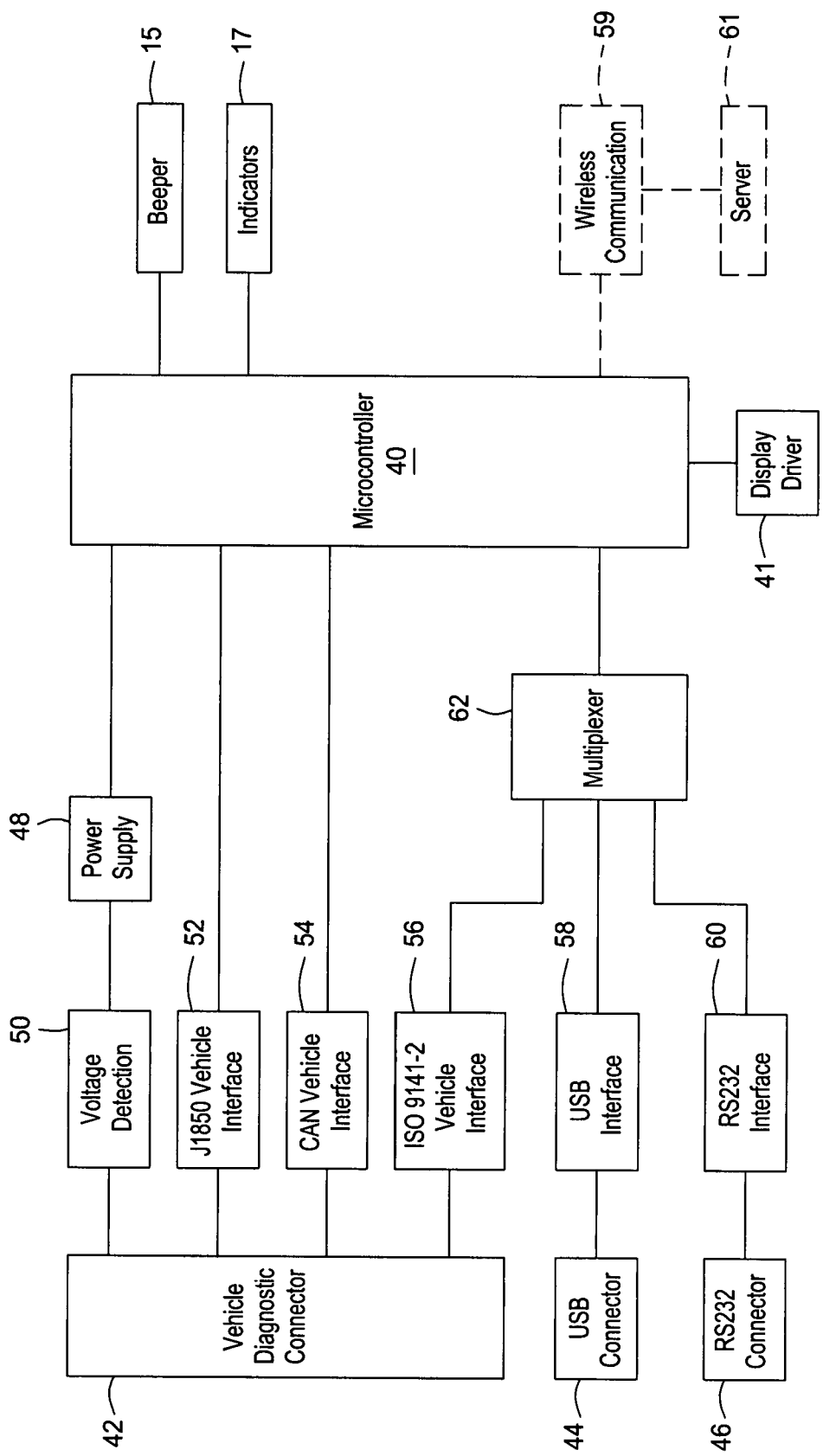
FIG. 3 is a schematic illustration of the tools of FIGS. 1 and 2.

An embodiment of the present invention includes a vehicle tool that monitors the status of the I/M readiness monitors to determine if the vehicle is "Ready" for an emissions test. The tool will indicate to a driver that the vehicle is ready for emissions testing by alerting the user via, for example, audio and/or visual signals or other alert indicators. Checking the readiness state of the diagnostic monitors allows a driver to save time by not having to return the vehicle for testing only to find out that the vehicle is still not ready for emissions testing. The vehicle tool also includes software that determines when the tool should communicate with the vehicle's diagnostics systems so that the tool does not interfere with the vehicle's own diagnostic systems tests.

The invention will now be described with reference to the drawing figures, in which like reference numerals refer to like parts throughout. FIG. 1 is a plan view illustrating a cabled device 10 according to an embodiment of the invention. The tool 10 includes generally, a housing 12 and a display 14. The housing 12 has an opening 16 for coupling a cable 18 to the housing 12. The display can be any type of display, such as an LCD, that provides any type of information, such as DTCs or that the vehicle is ready or not ready for emissions testing. The cable 18 couples the tool 10 to a connector 20 having an interface 22 that connects to a vehicle's onboard computer (not shown). The cable can be any length desired so that it allows the housing to be at any length away from the vehicle's computer as desired. In addition, a beeper 15 and an indicator 17 are disposed on the housing 12 to indicate when the vehicle is ready for emissions testing. The interface 22 can be any interface that interfaces with a vehicle, including a Data Link Connector (DLC), such as, for example, an SAE J1962 connector.

FIG. 2 is a plan view of a non-cabled tool 24 according to another embodiment of the invention. The non-cabled tool 24 has a housing 26 with a display 14. The housing 26 has an opening 30 for affixing the connector 22 that couples to a vehicle's onboard computer (not shown). Like tool 10, tool 24 also has the beeper 15, indicator 17, and the display 14 disposed on the housing 26. The non-cabled embodiment provides a compact device for a true one-piece device and compact storage. This embodiment can also be cheaper to produce due to decreased expense of not having a cable. Although both the beeper 15 and the indicator 17 are illustrated, only one or both may be used by the tool 10 or 24 and still be within the spirit of the present invention.

Internally, the tools 10 and 24 include a processor, memory, random access memory (RAM), communication circuitry and a power supply. The processor is configured with software enabling it to determine from the OBD II system whether the monitors are set to "Ready" in order to perform the emissions test.

FIG. 3 is a schematic illustration of the tools 10 and 24 of FIGS. 1 and 2. In particular, the tools 10 and 24 have a microcontroller or processor 40. The processor 40 is coupled to a vehicle diagnostic connector 42, a USB (Universal Serial Bus) connector 44, and an RS232 connector 46. In an alternative embodiment, the processor 40 can be a Field Programmable Gate Array (FPGA) or any other type of processor or controller.

The processor 40 is coupled to the vehicle diagnostic connector 42 through an SAE J1850 vehicle interface 52, a CAN (Controlled Area Network) vehicle interface 54 and an ISO 9141-2 vehicle interface 56. The processor is coupled to the ISO 9141-2 vehicle interface 56 by way of a multiplexer 62. The J1850 vehicle interface 52 includes the hardware and/or software that allow the processor 40 to communicate with a vehicle equipped with J1850 communication protocol. The CAN vehicle interface 54 includes the hardware and/or software that allow the processor to communicate with a vehicle equipped with CAN communication protocol. Additionally, the ISO 9141-2 vehicle interface includes the hardware and/or software that allow the processor 40 to communicate with a vehicle equipped with ISO 9141-2 communication protocol. The ISO 9141-2 vehicle interface allows communication by the tools 10 or 24 in ISO 14230 (Keyword 200). A person skilled in the art will recognize that other vehicle communication protocols may also be utilized and that their respective interfaces are well within the embodiments of this invention.

The processor 40 couples to the USB connector 44 using a USB interface 58 and couples to the RS232 connector 46 through an RS232 interface 60. The processor 40 couples to the USB interface 58 and the RS232 interface 60 via the multiplexer 62. The USB connector 44 allows the tool to communicate with another computing device, such as a computer, Personal Digital Assistant (PDA) or a scan tool, while the RS232 can be used to communicate with other communication equipment, including computing devices. The processor also couples with a display driver 41 to drive the display 14.

Further, a power supply 48 powers the processor 40 and the tool 10 or 24. The power supply 48 may be provided by the VUT or another power source, such as a battery (external or internal to the housing). The processor 40 is coupled to the power supply 48 through a voltage detection device 50. The voltage detection device 50 detects whether operating the full circuitry of the tool and/or charging the tool's internal battery, risks significantly discharging the vehicle's battery. When the vehicle's battery would be significantly drained by operating the full circuitry of the tool, the tool 10 or 24 is powered down and only the low-power voltage detection circuitry is operational. The processor 40 is also coupled to the beeper 15 and indicator 17 (discussed in greater detail below).

A device that uses power provided by the vehicle may drain the vehicle's battery unless the device is powered off when the vehicle engine is not running. In an embodiment of the present invention, tool 10 or 24 may be left coupled to the vehicle's computer even when the vehicle engine is not running without draining the vehicle's battery. The voltage detection device 50 may have a predetermined threshold of voltage for powering on, such as, for example 12.7 volts, the voltage of a fully charged battery. When the vehicle engine is started, the charging system may apply approximately 13.5 volts to the battery. This voltage keeps the battery fully charged and sometimes in an over charged state.

The voltage detection device 50 detects when the battery voltage is greater than 12.7 volts, the detection threshold, and the tool 10 or 24 powers on. It stays on while the vehicle engine is running and therefore, is powered by the vehicle charging system or the vehicle's battery. When the engine is turned off, the battery voltage will be approximately 13.5 volts. However, the voltage begins to decrease to the fully charged voltage of approximately 12.7 volts. While the battery's voltage decreases, the tool 10 or 24 is still powered on and receives power from the vehicle's battery. The time required for the decrease in voltage from 13.5 to 12.7 volts depends on various factors such as the strength of the battery, how long the vehicle was running, the battery temperature, etc. Time durations for this transition may be between approximately one to thirty minutes.

When the voltage reaches the detection threshold, the tool 10 or 24 powers off. Incidentally, the power drawn by the voltage detection device 50 may be negligible and does not discharge the vehicle battery. Thus, the tool 10 or 24 is powered on when the vehicle engine is (or has recently been) running and is powered off when the vehicle's engine is not (or has not recently been) running. However, in other embodiments of the invention, the tool 10 or 24 remains powered on for a certain amount of time after the vehicle powers off, so that the user can inspect the indicators 15 or 17 to ascertain whether the vehicle is "Ready."

In the event that the vehicle battery is weak and the time for the vehicle's battery to return to the fully charged state from the over charged state, is short, the tool 10 or 24 may be configured to remain powered on for a particular period of time beyond the time the vehicle powers off. For example, the tool 10 or 24 may remain powered on for approximately two minutes. This permits the operator to inspect the tool 10 or 24 even though the vehicle has powered off. Further, this time delay embodiment also does not significantly discharge the vehicle battery.

Thus, the tool 10 or 24 may also be plugged into the vehicle even when the vehicle's engine is not running without discharging the vehicle battery. The tool 10 or 24 is capable of turning on only when there is no risk of battery drain. When there is a risk of battery drain, the tool enters the stand-by mode where it requires very little or no power. When the tool 10 or 24 is operating, it draws its power from the vehicle's battery and/or charging system. Alternatively, the tool 10 or 24 may be powered by another source internal or external to the housing, such as the tool's own battery.

In a further embodiment of the present invention, the processor 40 may also be coupled to a wireless communication device 59 which may communicate with a server 61. In this manner, the processor 40 may communicate with a remote indicator that the vehicle is "Ready" for emissions testing. Thus, the server 61 may be used to send an email, text message or the like to any computing device, such as a PDA, PC, pager or cellular telephone indicating, for example, that the vehicle is ready for emissions testing. The server, which is a computing device, can itself indicate that the vehicle is ready for emissions testing via the methods described herein. The wireless communication device 59 and processor 40 may also communicate directly with another computing device, such as a PDA, PC, pager, or cellular telephone without first going through the server 41. Additionally, software updates, reprogramming, and functional aspects of the tool can be controlled via the wireless communication.

OBDII devices have the ability to communicate with the vehicle using one of the many different vehicle communication protocols that may exist in the vehicle's control system. Although, it should be transparent to the technician, not all devices communicate with all vehicles. Thus, a technician must own several different scan tools to perform engine performance diagnostics on a variety of vehicle makes. This can be an expensive endeavor. In this embodiment, all communication protocols can be utilized with the tool to communicate with the vehicle.

The tools 10 and 24 may be reprogrammed or configured by a technician using a computing device such as a personal computer, PDA or a scan tool with configuration software. For instance, if the technician wants to check the status of only a few of the 11 diagnostic monitors, the technician can configure the tool 10 or 24 to do so. New or additional information can be uploaded to the tool 10 or 24 in a similar fashion. The tool 10 or 24 simply needs to be connected to a computing device, such as a personal computer (PC), PDA or scan tool using a Universal Serial Bus (USB) interface 58, a RS232 serial interface 60, a wireless communication or an infrared connection. Any means of connecting the tool may be used including wireless and wired connections or other communication protocols are within the spirit of the invention.

Figure 4:
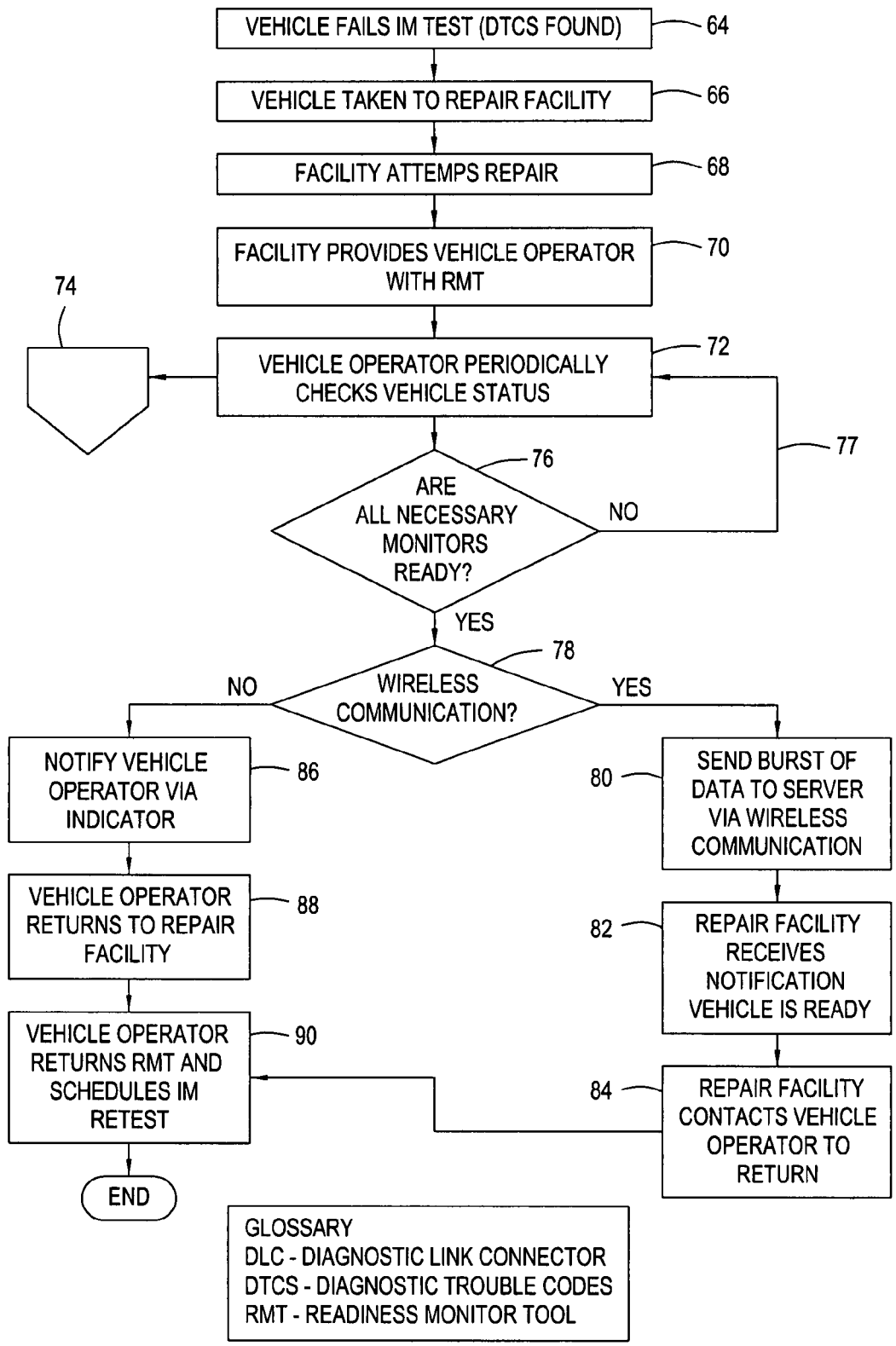
FIG. 4 is a flowchart illustrating steps in accordance with one embodiment of the method of the invention.

FIG. 4 is a flowchart illustrating steps in accordance with one embodiment of the method of the present invention. The vehicle fails the I/M testing and DTCs are found at step 64. When the vehicle fails, the vehicle is taken to the repair facility at step 66 and the repair facility attempts to repair the vehicle at step 68. The DTCs are erased, which also set the readiness state of all of the diagnostic monitors to "Not Ready." The repair facility may be located at the same place as where the emission test is conducted. The facility then provides the vehicle operator with a readiness monitor tool 10 or 24 at step 70. The vehicle operator uses the tool 10 or 24 and periodically checks the "Ready" status at step 72 to determine if the vehicle has completed its Drive Cycle and whether the monitors are "Ready." If the necessary monitors are not ready, then proceed to step 77 and return to step 72 where the operator periodically checks until the monitors are ready. The tool can also periodically query the monitors at certain time intervals to determine if the monitors are "Ready."

If it is determined that all the necessary monitors are ready at step 76, the tool then determines it has wireless communication capabilities at step 78. If the tool has wireless communication capabilities, the tool sends a burst of data to the server 61 via the wireless communication device 59 at step 80. The repair facility then receives a notification, such as an email or other type of notification that the vehicle is ready for inspection at step 82. The repair facility then contacts the vehicle operator to return the vehicle and the tool at step 84. The operator then returns the tool and schedules an I/M retest at step 90.

After the tool determines whether all the necessary monitors are ready, if the tool does not include wireless communication at step 78, the tool then notifies the vehicle operator through an audio and/or visual indicator at step 86 via the beeper 15 or indicator 17 that the vehicle is ready for emissions testing. Upon being notified, the vehicle operator returns to the facility at step 88 and returns the tool and schedules an I/M retest at step 90 ending the process. Alternatively, the tool can provide wireless notification and notifies the operator through audio and/or visual indications on another device.

Figure 5:
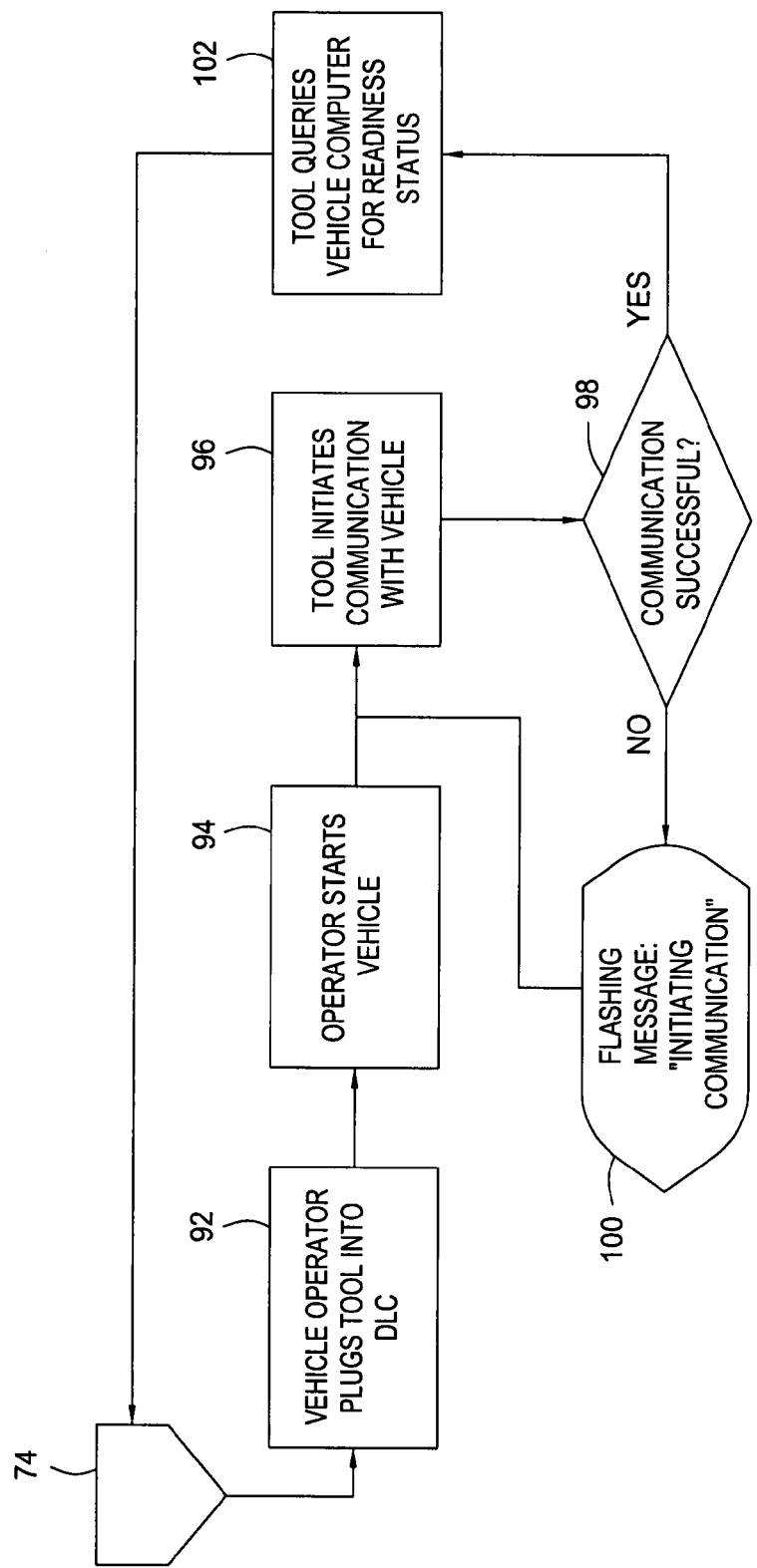
FIG. 5 is another flowchart illustrating steps in accordance with one embodiment of the method of the invention.

FIG. 5 is another flowchart illustrating steps in accordance with one embodiment of the method of the present invention. During the period where the operator periodically checks the status at step 72, the vehicle operator plugs the tool into the diagnostic link connector at step 92 and starts the vehicle at step 94. The tool then initiates communication with the vehicle at step 96. If the tool has not initiated communication successfully at step 98 with the vehicle, the display indicates that the tool is still attempting to communicate with the vehicle at step 100 and returns to step 96. Once the communication is successful, the tool queries the vehicle's onboard computer to determine whether the vehicle is ready at step 102. If it is ready, then the tool 10 or 24 will proceed to step 76 via step 74.

Figure 6:
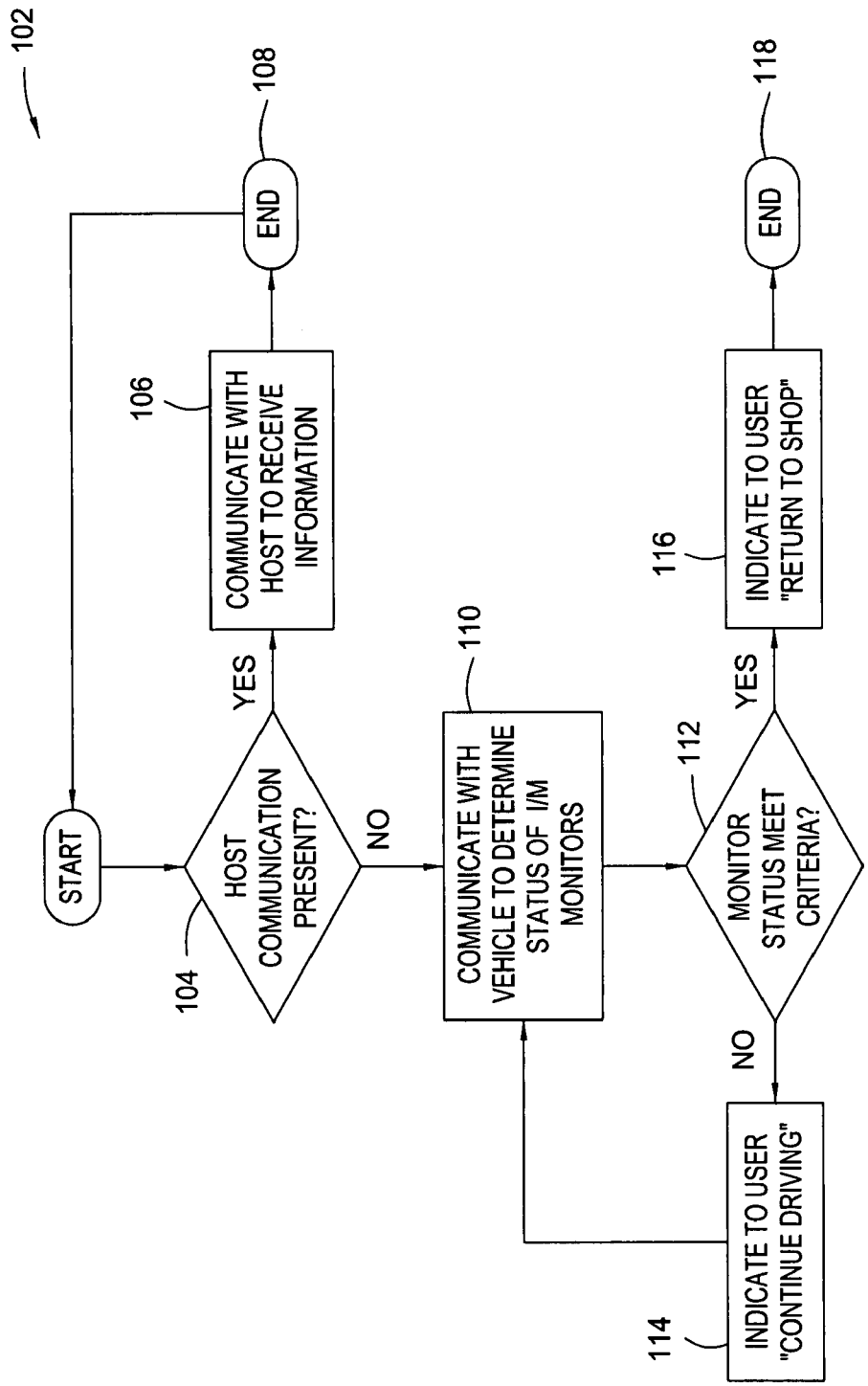
FIG. 6 is a flowchart illustrating the steps residing in the processor.

FIG. 6 is a flow chart illustrating the software program 102 residing in the processor 40. At step 104, when the tool is operational or on, the tool queries to see if a host computer is present. The host may be any computing device, such as, for example, a PC, a PDA or a scan tool that can be used to configure the tool. If host communication is present, the tool proceeds to communicate with the host to receive information, such as configuration data, updates or a new program at step 106. This may be new updates, for example, from an automobile manufacturer or software needed to communicate in a different communication protocol. Additionally, the tool can be configured to ignore certain readiness monitors that are always "off" due to certain conditions, such as environmental conditions that may never exist regardless of how many Drive Cycles are completed. Once the tool has been configured, the process ends at step 108. At this point, the user can power off the tool or unhook the tool from the host. The tool can then return to step 104.

However, if the tool determines that it is not communicating with the host, then it initiates communication with the vehicle's computer to determine the status of I/M monitors at step 110, then it proceeds to step 112 to determine whether the monitor status criteria has been met. If the criteria has not been met, the tool proceeds to step 114 where it indicates to the vehicle operator to "continue driving" on the display.

The "continue driving" indication may also be in the form of the beeper 15 or, for example, a light on the indicator 17, such as a red light. Also, this indication may be in the form of an in-action, in that there is no audible or visual indication through beeper 15 or indicator 17 in the event the criteria are not met and the vehicle operator has to continue driving. The tool then proceeds to 110 where it continues to communicate with the vehicle to determine the status of the I/M monitors and proceeds to step 112.

If the criteria has been met, the tool indicates to the vehicle operator that it is time to "return to the shop" at step 116. This indication may be had by way of, for example, an audible sound on the beeper 15 or a green light, or another type of visual indication on the indicator 17. Then the process ends at step 118. The "return to shop" signal may also be displayed alphanumerically on the display.

Although various configurations are possible, in an embodiment of the present invention, the beeper 15 may be a piezo-electric beeper having a variety of beeping mechanisms. The length and timing of beeps may be adjusted as desired. The indicator 17 may be a LED display or a plurality of LED displays. These LED indicators may flash on, turn off or held on continuously to indicate when the vehicle is "Ready" or "Not Ready."

Figure 7:
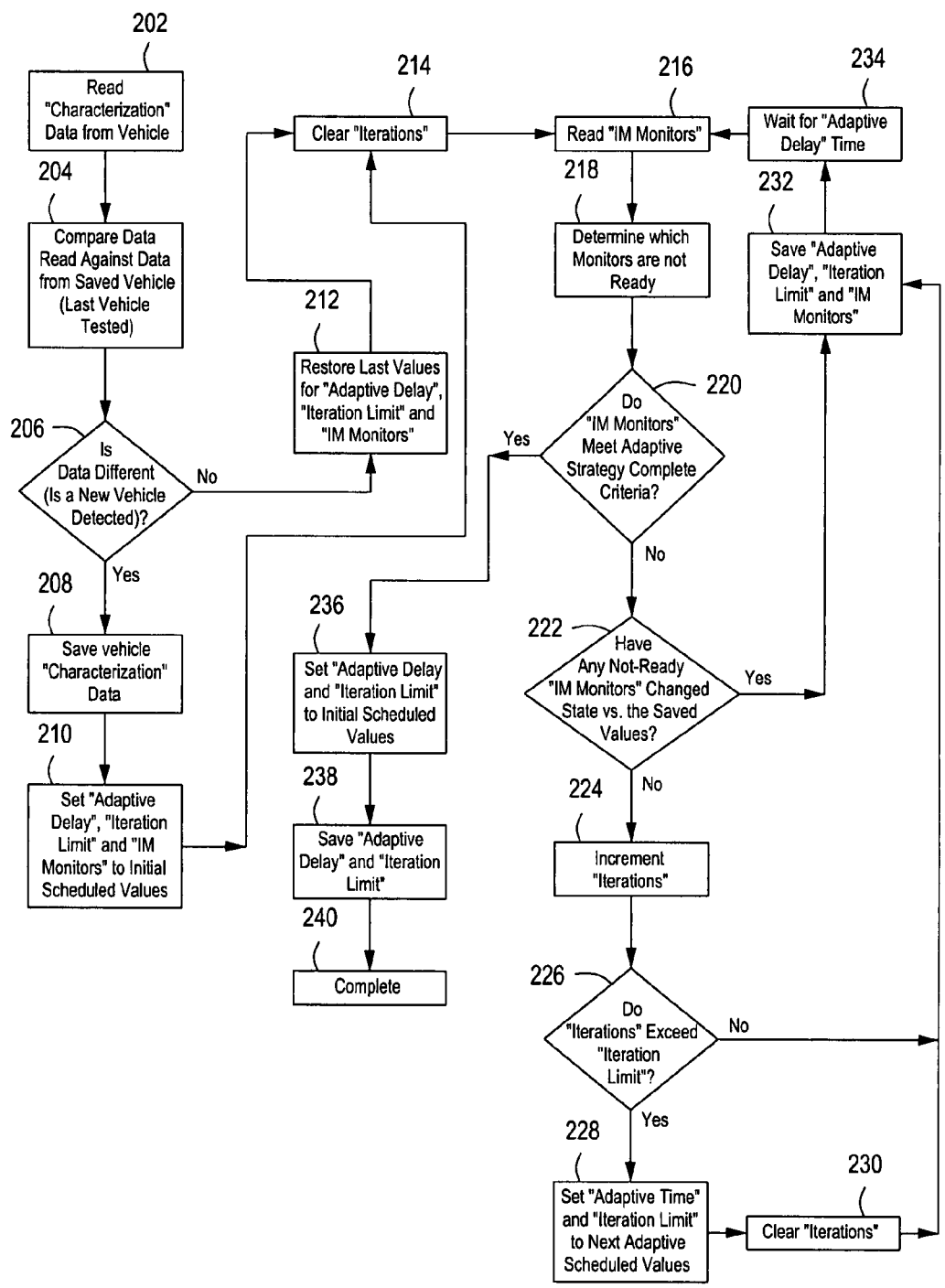
FIG. 7 is a flowchart illustrating the adaptive steps in accordance with an embodiment of the invention.

The tool 10 or 24 can include a software module that allows the tool to adaptively communicate with the vehicle's diagnostic systems without interfering with the vehicle's own diagnostic systems tests. The software can run independently or in conjunction with other software in the tools 10 and 24. FIG. 7 is a flow chart 200 illustrating the adaptive steps in accordance with an embodiment of the invention. At step 202, the software reads characterization data from the vehicle. At this step, the tool is connected to the DLC and the tool reads the characterization data from the vehicle. The characterization of the vehicle can include information such as the VIN (vehicle identification number), the number of active pins on the DLC, the communication protocol being used by the vehicle and other vehicle data that allows the tool to determine if it has recently or previously communicated with this vehicle. Any vehicle data can be used as long as the tool can use the data to identify that it has recently or previously communicated with the now connected vehicle. Once the tool retrieves the characterization data from the vehicle, at step 204, the software compares the characterizing data against previously saved data of vehicles that the tool previously or recently communicated with. In another embodiment, the saved data is from the last vehicle tested.

At step 206, the software determines based on the characterization data comparison if a new vehicle is detected. If a new vehicle is detected, the software will save the new vehicle's characterization data in memory at step 208. Then the software proceeds to step 210 wherein the software sets the adaptive delay (the time interval that the tool interrogates at), iteration limit (how many iteration the tool will interrogate at that time interval before moving to another time interval) and I/M monitors to initial set values. The tool can determine if the vehicle's own diagnostic systems is not resetting the readiness monitor over for a period of time. Thus, the tool can determine that its own interrogation with the vehicle may be interfering with the vehicle's diagnostic systems ability to conduct its tests. The tool can then adapt and change the interval at which it is interrogating with the vehicle. As an example, the tool can start interrogating the vehicle at 1 minute intervals and then to other intervals such as, 3 minutes, 5 minutes, 10 minutes, 15 minutes, 30 minutes, 1 hour, 3 hours and so on. The tool can set an iteration limit as to how long the tool will interrogate the vehicle at that time interval (1 minute, 5 minutes, etc., for such time as 5 times, 10 times, 15 times, 20 times and so on. The I/M monitors are also set to initial values or none are ready status. Thus, the tool can have initial set values at 1 minute (interval delay), 1 of 10 (10 being the iteration limit) and all the I/M monitors are at not read status.

If at step 206, the software determines that a new vehicle is not present, then the software proceeds to step 212. At this step, the tool is restored to the last stored settings for the adaptive delay (such as 10 mins.), iteration limit ($3^{rd}$ iteration of 10) and I/M Monitors (that were last read). The restored settings can be settings from the last time the tool communicated with the vehicle such as when tool was powered off (tool saves settings before powering off), but still connected or when the tool was disconnected (settings saved before disconnecting) and the reconnected with the vehicle. By returning to the restored settings, the tool does not spend time to repeat the previous time intervals, if any, and thus saving time for the user. The stored settings can be stored in the internal memory of the tool or an external memory, such as a flash memory.

From steps 210, 212, the software proceeds to step 214, where the iteration is cleared. This way, the tool can start at the beginning of any time interval that was previously set. Thus, if the previous step was step 212 (not new vehicle), the tool can start from the first iteration of that interval to ensure that the tool has had a chance to complete the iteration limit at that interval. The software then proceeds to step 216 where the tool reads the state of the I/M monitors in the vehicle. At step 218, the tool determines which I/M monitors are not ready.

At step 220, the software determines if all the I/M monitors are ready (or if the monitor was exempted by the state or other reasons) and the vehicle is ready for emissions testing or not. If the vehicle is ready, then the software proceeds to step 236, where the tool resets the adaptive delay, iteration limit and I/M Monitors to initial values (similar to step 210). The software resets to the initial values because the adaptive value and iteration limit may not be at the initial value and limit and the tool should start from the beginning. For example, the last tool setting could be 10 minutes at $3^{rd}$ of 10 iteration, and should now be at 1 minute and $1^{st}$ of 10 iteration or what ever the initial values desired by the user. At step 238, the tool saves the adaptive delay and iteration limit data and the software ends at step 240.

If the vehicle is not ready at step 220, the software proceeds to step 222, where it determines if any not-ready I/M Monitors have changed state as compared to the saved values (from step 212). If yes, this indicates that the vehicle diagnostic system testing is proceeding as it should. Thus, at step 232, the software saves information related to the adaptive delay, iteration limit and the I/M monitors have reported ready. Alternatively, the software can remain with the current adaptive delay and iteration setting without saving. At step 234, the software waits until the appropriate adaptive delay time before again interrogating the vehicle and starts a loop by returning to step 216. This process will be repeated until step 220, when the software determines that the vehicle is ready for emissions testing and proceeds to step 236.

If at step 222, the software determines the I/M monitors have not changed state, then the tool may be interfering with the vehicle's diagnostic system and may need to change the time interval that it interrogates the vehicle. At step 224, the software increase to the next increment in the iteration. So it may go from $3^{rd}$ iteration to $4^{th}$ iteration of the limit 10. At step 226, the software determines if the limit iteration has been reached. If no, the software proceeds to step 232 as discussed above. If yes, then at step 228, the software then proceeds to the next adaptive time and restarts the iteration at step 230. Then the software proceeds to step 232 as discussed above. The software ends at step 240 as stated above.

The adaptive software and the steps associated therewith discussed above can be performed on tool 10 or 24. However, the adaptive software and the steps can be performed on any vehicle tool including the scan tools and code readers available from SPX Corporation's Service Solutions Division. The adaptive software is not limited to being used with programs that relate to I/M testing and can be used for other diagnostic procedures, such as retrieving DTCs from a vehicle or requesting information from a sensor of the vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle diagnostic tool comprising:
    a processor that can be operably coupled to a vehicle diagnostic connector to diagnose a vehicle;
    at least one vehicle communication protocol interface operatively coupled to the processor and allows the processor to communicate with the vehicle at a time interval;
    a memory operably coupled to processor;
    a software stored in the memory, wherein the software adaptively changes the time interval at which the processor communicates with the vehicle when the software detects that the data being received from the vehicle is not progressing for a particular diagnostic test; and
    a housing surrounding the processor, the at least one vehicle communication protocol interface, the memory, wherein the housing has a port configured to couple to a computing device; and
    wherein the software saves characterization data of a plurality of vehicles, and the software determines whether the vehicle is one of plurality of vehicles that the tool previously tested and, if the vehicle has been previously tested by the tool, the software is configured to retrieve a previously saved time interval and iteration limit enabling the tool to begin communicating with the vehicle at the previously saved time interval and iteration limit.

2. The tool of claim 1, wherein the software adaptively changes the time interval at which the tool communicates with the vehicle, and allows the tool to communicate at the time interval before an iteration limit is reached.

3. The tool of claim 1, wherein the time interval is one of the following: 1 minute, 3 minutes, 5 minutes, 10 minutes, 15 minutes, 30 minutes, 1 hour, or 3 hours.

4. The tool of claim 2, wherein the iteration limit is one of the following: 5 times, 10 times, 15 times, or 20 times.

5. A method of adaptively communicating with a vehicle using a diagnostic tool, comprising:
connecting the diagnostic tool to a data link connector of the vehicle;
reading characterizing information of the vehicle;
communicating with the vehicle to perform a diagnostic test on the vehicle with the diagnostic tool at a first time interval;
determining whether the diagnostic test with the vehicle is progressing based on the sequence of the diagnostic test;
changing to a second time interval and communicating at the second interval for an iteration limit when the diagnostic test is not progressing;
comparing the characterizing information of the vehicle with previously saved characterizing information to determine whether the vehicle was previously tested; and
wherein if the vehicle was previously tested, the tool retrieves a previously saved time interval and iteration limit and begins communicating with the vehicle at the previously saved time interval and iteration limit.

6. The method of claim 5, wherein the vehicle which was previously tested includes the vehicle with which the tool is still connected but the tool was powered down or the tool was disconnected from the vehicle, but is now reconnected for further testing.

7. The method of claim 5, wherein the second time interval is one of the following: 1 minute, 3 minutes, 5 minutes, 10 minutes, 15 minutes, 30 minutes, 1 hour, or 3 hours.

8. The method of claim 5, wherein the iteration limit is one of the following: 5 times, 10 times, 15 times, or 20 times.

9. The method of claim 5, wherein when the iteration limit is reached at the first time interval, then the tool proceeds to the second time interval until the iteration limit is reached at the second time interval.

10. The method of claim 5, wherein the diagnostic test tests whether the vehicle is ready for emissions testing.

11. The method of claim 5, wherein the characterizing information is information that allows the tool to determine whether or not the tool has communicated with the vehicle.

12. A computer readable medium comprising a computer program, wherein the computer program, when accessed, results in a vehicle diagnostic tool:
reading characterizing information of a vehicle;
communicating with the vehicle to perform a diagnostic test on the vehicle with the diagnostic tool at a first time interval;
determining whether the diagnostic test with the vehicle is progressing based on the sequence of the diagnostic test;
changing to a second time interval and communicating at the second interval for an iteration limit when the diagnostic test is not progressing;
comparing the characterizing information of the vehicle with previously saved characterizing information to determine whether the vehicle was previously tested; and
wherein if the vehicle was previously tested, the tool retrieves a previously saved time interval and iteration limit and begins communicating with the vehicle at the previously saved time interval and iteration limit.

13. The computer readable medium of claim 12, wherein the vehicle which was previously tested includes the vehicle with which the tool is still connected but the tool was powered down or the tool was disconnected from the vehicle, but is now reconnected for further testing.

14. The computer readable medium 12, wherein the second time interval is one of the following: 1 minute, 3 minutes, 5 minutes, 10 minutes, 15 minutes, 30 minutes, 1 hour or 3 hours.

15. The computer readable medium claim 12, wherein the iteration limit is one of the following: 5 times, 10 times, 15 times, or 20 times.

16. The computer readable medium of claim 12, wherein when the iteration limit is reached at the first time interval, then the tool proceeds to the second time interval until the iteration limit is reached at the second time interval.

17. The computer readable medium of claim 12, wherein the diagnostic test tests whether the vehicle is ready for emissions testing.

18. The computer readable medium of claim 12, wherein the characterizing information is information that allows the tool to determine whether or not the tool has communicated with the vehicle.

* * * * *